United States Patent Office 3,522,272
Patented July 28, 1970

3,522,272
INTERMEDIATES FOR THE PREPARATION OF 1 - p - CHLOROBENZOYL - 2 - METHYL - 3-INDOLYLACETIC ACID COMPOUNDS
John Martin Chemerda, Plainfield, and Meyer Sletzinger, North Plainfield, N.J., assignors to Merck & Co., Inc., Rahway, N.J., a corporation of New Jersey
No Drawing. Filed Aug. 9, 1967, Ser. No. 659,541
Int. Cl. C07d 27/56
U.S. Cl. 260—326.12    4 Claims

ABSTRACT OF THE DISCLOSURE

The invention relates to processes for preparing 1-p-chlorobenzoyl - 2 - methyl - 5 - (methoxy) or (dimethylamino)-3-indolyl acetic acid by reducing a 1-p-chlorobenzoyl-2-substituted-5-(methoxy or (dimethylamino)-3-indolyl acetic acid. The intermediate 1-p-chlorobenzoyl-2-substituted-5-(methoxy) or (dimethylamino)-3-indolyl acetic acid compounds are also claimed.

This invention relates to a new method of preparing certain 1-p-chlorobenzoyl-3-indolylacetic acid derivatives and new intermediates therefor. More particularly, it relates to a method of preparing compounds of the Formula I:

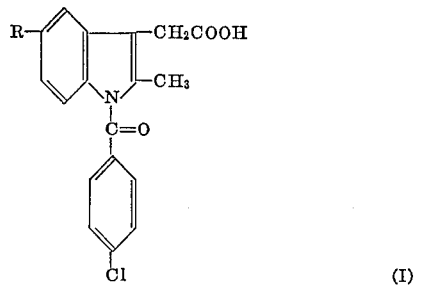

wherein R is methoxy or dimethylamino. These compounds are disclosed and claimed in U.S. Pat. No. 3,161,-654, issued Dec. 15, 1964, to Shen.

In the Shen patent, compounds of Formula I are prepared by a series of reactions in which a 2-methyl-3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new process whereby these compounds can be prepared.

It has now been discovered in accordance with the present invention that 1-p-chlorobenzoyl-2-methyl-5-methoxy-3-indolylacetic acid or 1 - p - chlorobenzoyl-2-methyl-5-dimethylamino-3-indolylacetic acid of Formula I can be prepared by a reduction reaction in which a compound of the Formula II:

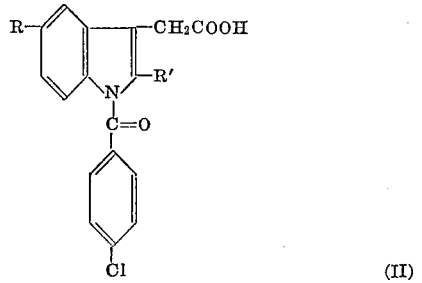

(or a salt thereof, e.g., the sodium, potassium or ammonium salt) is subjected to either catalytic or chemical reduction whereby the group R' is converted to methyl. In Formula II, the symbol R' is intended to represent either:

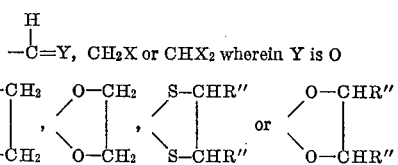

and X is either Cl, Br, I, SR", SH, S(O)R", SO₂R", SSR", N⁺(R")₃Z⁻, N(R")₂, OH, OR" or OC(O)R", Z being Cl, Br or I and R" being lower alkyl, aryl (e.g., phenyl, tolyl, o-naphthyl) or ar(lower alkyl).

The applicable reducing reagents for the desired chemical conversion can be divided into two categories; chemical and catalytic.

Among the chemical reducing reagents are zinc (preferably as an amalgam) or magnesium in aqueous alcohol or an acid such as acetic or hydrochloric acid or a mixture of acids; a zinc copper couple in an alkanol (e.g., methanol or ethanol); aluminum amalgam in a strong acid; and palladized zinc in a strong acid. In general, for chemical reduction, it is not necessary to use a solvent since the reaction proceeds without one; however, in some cases use of a solvent such as desulfurized toluene or dioxane may permit the reaction to proceed more rapidly than otherwise. The acid group of the starting material can react with magnesium or zinc to generate hydrogen in situ.

Among the many catalytic reducing agents there can be named hydrogen with palladium or platinum (on a support such as carbon), nickel, Raney nickel, molybdenum sulfide, lithium aluminum hydride, copper chromite, or the like.

While the reducing methods named above work generally, it is desirable to use certain of these methods with certain starting materials for ease and efficiency of operation. Thus, it is preferred when the starting material is a 2-aldehydoindole derivative to conduct the reduction using a chemical reducing agent such as zinc in a strong acid. The zinc may be in the form of an amalgam and a solvent which is sulfur-free, e.g. sulfur-free toluene, may be used in the reaction. If hydrochloric acid is used, it may be propitious to use aqueous acetic acid as the diluent instead of water. Alternatively, the reaction may be conducted with hydrochloric acid and a dioxane solvent in conjunction with the zinc. Of course, other solvents such as aromatic hydrocarbons, high boiling ethers, tetrahydrofuran, alcohols, etc., may also be used. Although hydrochloric acid is conventionally used, sulfuric acid may be used in its place.

The chemical reduction of the aldehydo group may be conducted within a wide temperature range. In general, this temperature should be between the freezing and the boiling points of the solvent although reaction generally proceeds best at higher temperatures.

The reduction of the 2-aldehydo group to a methyl group may be accomplished by catalytic means; thus, Raney nickel may be used as the catalyst, and the reaction is conducted by bubbling hydrogen through the reaction mixture or under a pressure of hydrogen. Solvents such as alcohols, e.g. methanol, ethanol, or aqueous mixtures thereof, may be used in the reaction. For efficiency, it is desirable to use a pressure of over 500 p.s.i. The upper limit of the pressure is only governed by the limitations of the apparatus which is used. In most cases, it will be found that a pressure of 1,500 to 2,000 p.s.i. is sufficient to obtain a reaction within a reasonable time period. The reduction of the aldehyde group may be catalytically accomplished with the other catalytic agents named above, such as palladium or platinum in the presence of hydrogen.

In general, when the radical on the 2-position of the starting material contains sulfur, it is most desirable to use a catalytic method based on Raney nickel or molybdenum sulfide to prepare the desired 2-methylindole derivative since these catalysts are relatively immune to sulfur poisoning. Except for the choice of catalyst, the reduction of these compounds is conducted along the lines outlined for the catalytic conversion of a 2-aldehyde group to a 2-methyl group.

Where X is a group such as quaternary ammonium, halogen, hydroxy, substituted hydroxy, or acyloxy, the conversion to a methyl radical can be accomplished with equal facility by either chemical or catalytic reducing agents, as described above. In the case of the conversion of a hydroxy-methyl group to a 2-methyl group, it is sometimes expedient to convert the group to a tosyloxymethyl radical and then accomplish the reduction by catalytic means.

The actual procedures for carrying out the above-described reduction processes requires the mixing of the starting material in a solvent, if desired, with either the catalytic or the chemical reducing agent and maintaining reaction conditions for a period sufficient to allow the reaction to proceed as desired. When either the catalytic or the chemical means is used, it is, of course, necessary that sufficient hydrogen be available to reduce the radical on the 2-position to a methyl group. Depending upon the number of hydrogens to be added to each mole of starting material, the amount of reducing reagent should be between one and two moles for each mole of starting material.

The starting materials of Formula II can be prepared in various ways. The 2-aldehydo derivative can be obtained by treating 1-p-chlorobenzoyl-2-tosyloxymethyl-5-R-3-indolylacetic acid with anhydrous sodium bicarbonate in anhydrous dimethylsulfoxide at 100° C.

The 2-halomethyl derivatives of Formula II can be obtained by treating 1-p-chlorobenzoyl-2-tosyloxymethyl-5-R-3-indolylacetic acid with a lithium halide (e.g., the chloride, bromide or iodide) in a solvent such as acetone.

The 2-thiomethyl derivative of Formula II can be obtained by treating 1-p-chlorobenzoyl-2-tosyloxymethyl-5-R-3-indolylacetic acid with excess sodium mercaptide or an alkanethiol sodium salt at room temperature, acidifying the reaction product and filtering off the product. The corresponding 2-sulfonylmethyl derivative is obtained by oxidizing the 2-thiomethyl compound.

The 2-aminomethyl derivatives of Formula II can be obtained by treating 1-p-chlorobenzoyl-2-tosyloxymethyl-5-R-3-indolylacetic acid with a primary or secondary amine such as a mono- or di(lower alkyl) amine in a solvent medium. The corresponding quaternary ammonium derivatives wherein R is methoxy are obtained by reacting the amine with an excess of alkyl halide, e.g. methyl bromide or iodide.

The 2-ethylene dithiomethyl derivatives and the alkyl, aralkyl or aryl substituted analogs thereof Formula II can be prepared by reacting the 2-aldehydo derivative described above with the corresponding ethylene 1,2-dithiol, fused zinc chloride and sodium sulfate. The 2-thioacetals [—CH(SR″)$_2$] are prepared in the same manner using R″SH instead of the ethylene 1,2-dithiol.

The 2-acetonides and the alkyl, aralkyl or aryl substituted analogs thereof of Formula II are prepared by reacting the 2-aldehydo derivative described above at reflux temperature with the corresponding ethylene glycol and p-toluenesulfonic acid. The 2-acetals are similarly prepared by using an alkanol such as ethanol in place of the glycol.

The 2-carbacyloxymethyl derivatives of Formula II are prepared by treating the 2-tosyloxymethyl derivative described above with sodium acetate and an anhydrous carboxylic acid (e.g., acetic acid).

The 2-ethermethyl derivatives of Formula II are prepared by treating the 2-tosyloxymethyl derivative in alcoholic solution with a sodium alkoxide (e.g., ethanol and sodium ethoxide).

The 2-hydroxymethyl derivative of Formula II can be obtained by reacting dihydropyrane and 5-hydroxylevulinic acid in tetrahydrofuran containing a few drops of concentrated HCl to give 5-hydroxylevulinic pyranyl ether ester which is treated with p-methoxyphenylhydrazine or p-dimethylaminophenylhydrazine hydrochloride giving pyranyl 5-R-2-pyranyloxymethyl-3-indolylacetate (wherein R is as defined above) which is N-chlorobenzoylated after salt formation with sodium hydride in DMF. Depyranylation with hydrochloric acid and t-butanol gives 1 - p-chlorobenzoyl-5-R-2-hydroxymethyl-3-indolylacetic acid.

The 2-p-tosyloxymethyl derivative of Formula II is obtained by treating the above-described 2-hydroxymethyl derivative with tosylchloride in pyridine solution.

The following examples are presented to further illustrate the present invention.

EXAMPLE 1

To anhydrous dimethylsulfoxide (75 ml.) preheated to 100° was added cautiously (foaming) anhydrous sodium bicarbonate (10 g. followed by 1-p-chlorobenzoyl-2-tosyloxymethyl - 3 - methoxy - 3 - indolylacetic acid (5.28 g., 0.01 mole). The mixture was stirred well under nitrogen at 100° for 5 minutes, then rapidly cooled to room temperature and quenched into 500 ml. of water. After extraction with chloroform (2×100 ml.), the aqueous phase was acidified with dilute hydrochloric acid, the precipitated 1-p-chlorobenzoyl - 2 - aldehydo-5-methoxy-3-indolylacetic acid filtered off and purified by recrystallization from t-butanol.

EXAMPLE 2

To anhydrous dimethylsulfoxide (75 ml.) preheated to 100° was added cautiously (foaming) anhydrous sodium bicarbonate (10 g.) followed by 1-p-chlorobenzoyl-2-tosyloxymethyl - 5 - dimethylamino - 3 - indolylacetic acid (0.01 mole). The mixture was stirred well under nitrogen at 100° for 5 minutes, then rapidly cooled to room temperature and quenched into 100 ml. of water. After extraction with chloroform (2×100 ml.), the pH of the aqueous phase was adjusted to 5 with dilute hydrochloric acid, and the precipitated 1-p-chlorobenzoyl-2-aldehydo - 5 - dimethylamino-3-indolylacetic acid filtered off and purified by recrystallization from aqueous ethanol.

EXAMPLE 3

A solution of 1-p-chlorobenzoyl - 2 -tosyloxymethyl-5-methoxy-3-indolylacetic acid (0.1 mole) in 100 ml. of acetone containing 0.1 mole of lithium chloride was stirred for 48 hours at 25° C. The reaction mixture was concentrated in vacuo and the residue taken up in ether and filtered. The filtrate on concentration gives 1-p-chlorobenzoyl-2-chloromethyl - 5 - methoxy-3-indolylacetic acid.

The 2-bromomethyl and 2-iodomethyl derivatives are similarly obtained using lithium bromide and iodide, respectively, in the foregoing procedure.

EXAMPLE 4

A solution of 1-p-chlorobenzoyl - 2 - tosyloxymethyl-5-dimethylamino-3-indolylacetic acid (0.1 mole) in 100 ml. of acetone containing 0.1 mole of lithium chloride was stirred for 48 hours at 25° C. The reaction mixture was concentrated in vacuo and the residue taken up in ether and filtered. The filtrate on concentration gives 1-p-chlorobenzoyl - 2 - chloromethyl - 5 - dimethylamino-3-indolylacetic acid.

5

The 2-bromomethyl and 2-iodomethyl derivatives are similarly obtained using lithium bromide and iodide, respectively, in the foregoing procedure.

EXAMPLE 5

To 200 ml. of a methanolic solution of 0.1 mole of 1-p-chlorobenzoyl - 2 - tosyloxymethyl - 5 - methoxy-3-indolylacetic acid was added at 25° C. a methanolic solution of 0.2 mole of sodium methanethiolate. The reaction mixture is stirred at 25° C. for 48 hours, acidified with acetic acid and then concentrated in vacuo. The residue was taken up in ether, filtered and concentrated to give 1-p-chlorobenzoyl - 2 - methylthiomethyl - 5-methoxy-3-indolylacetic acid.

The 2-mercaptomethyl derivative can be prepared by substituting sodium mercaptide in the foregoing procedure for the sodium methanethiolate used therein.

The corresponding 2-methylsulfonylmethyl derivative can be prepared by oxidation of the compound prepared in Example 5.

EXAMPLE 6

To 200 ml. of a methanolic solution of 0.1 mole of 1-p-chlorobenzoyl - 2 - tosyloxymethyl - 5 - dimethylamino-3-indolylacetic acid was added at 25° C. a methanolic solution of 0.2 mole of sodium methanethiolate. The reaction mixture is stirred at 25° C. for 48 hours, acidified with acetic acid and then concentrated in vacuo. The residue was taken up in water, filtered and the pH of the filtrate adjusted to 5 to precipitate 1-p-chlorobenzoyl-2-methylthiomethyl-5-dimethylamino-3-indolylacetic acid.

The 2-mercaptomethyl derivative can be prepared by substituting sodium mercaptide in the foregoing procedure for the sodium methanethiolate used therein.

The corresponding 2-methylsulfonylmethyl derivative can be prepared by oxidation of the compound prepared in Example 6.

EXAMPLE 7

To 500 ml. of a dioxane solution containing four equivalents of dimethylamine was added at 5–10° C. with stirring 100 ml. of a dioxane solution of 1-p-chlorobenzoyl - 2 - tosyloxymethyl - 5 - methoxy - 3 - indolylacetic acid having 0.1 mole of the indole compound. The reaction mixture was stirred at 10° C. over 18 hours, acidified to a pH of 4 with hydrochloric acid and concentrated in vacuo. The residue was taken up in an excess of hot methanol and filtered from insoluble salts. The filtrate on concentration in vacuo gave 1-p-chlorobenzoyl - 2 - dimethylaminomethyl - 5 - methoxy - 3-indolylacetic acid which was purified by recrystallization from t-butanol.

EXAMPLE 8

To 500 ml. of a dioxane solution containing four equivalents of dimethylamine was added at 5–10° C. with stirring 100 ml. of a dioxane solution of 1-p-chlorobenzoyl-2 - tosyloxymethyl - 5 - dimethylamino - 3 - indolylacetic acid having 0.1 mole of the indole compound. The reaction mixture was stirred at 10° C. over 18 hours, acidified to a pH of 5 with hydrochloric acid and concentrated in vacuo. The residue was taken up in an excess of hot methanol and filtered from insoluble salts. The filtrate on concentration in vacuo gave 1-p-chlorobenzoyl-2-dimethylaminomethyl - 5 - dimethylamino - 3 - indolylacetic acid which was purified by recrystallization from aqueous ethanol.

EXAMPLE 9

1-p-chlorobenzoyl-2-aldehydo-5-methoxy-3-indolylacetic acid (3.72 g., 0.01 mole) is added slowly to an ice-cold stirred mixture of ethylene 1,2-dithiol (10 ml.), fused zinc chloride (1.25 g.) and anhydrous sodium sulfate (1 g.). The reaction mixture is then kept in a stoppered flask for 24 hours at 5° and at room temperature for 4 hours, and then poured into 500 ml. water. The precipitated

6

1 - p - chlorobenzoyl-2-ethylenedithiomethyl-5-methoxy-3-indolylacetic acid is filtered off and purified by recrystallization from t-butanol.

The corresponding 2-thioacetals may be prepared exactly as described above except for the use of an alkyl mercaptan, e.g. ethyl mercaptan, instead of ethylene 1,2-dithiol.

EXAMPLE 10

1 - p-chlorobenzoyl - 2 - aldehydo - 5 - dimethylamino-3-indolylacetic acid (0.01 mole) is added slowly to an ice-cold stirred mixture of ethylene 1,2-dithiol (10 ml.), fused zinc chloride (1.25 g.) and anhydrous sodium sulfate (1 g.). The reaction mixture is then kept in a stoppered flask for 24 hours at 5° and at room temperature for 4 hours, and then poured into 500 ml. water. After adjusting the pH to 5, the precipitated 1-p-chlorobenzoyl - 2 - ethylenedithiomethyl - 5 - dimethylamino-3-indolylacetic acid is filtered off and purified by recrystallization from aqueous ethanol.

EXAMPLE 11

A stirred mixture of 1-p-chlorobenzoyl-2-aldehydo-5-methoxy-3-indolylacetic acid (0.01 mole), ethylene glycol (10 ml.) and p-toluenesulfonic acid (0.1 g.) in benzene (100 ml.) was heated at reflux until the theoretical volume of water was collected in a Dean-Stark water trap. The benzene solution was then cooled to room temperature, washed well with water (2×100 ml.) and then concentrated to afford crude 1-p-chlorobenzoyl-2-ethylenedioxymethyl-5-methoxy-3-indolylacetic acid which was purified by recrystallization from t-butanol.

The open chain acetal [i.e., 2-(R″O)$_2$CH—] may be prepared exactly as above using an alkanol, e.g. ethanol (R″=ethyl) instead of ethylene glycol.

EXAMPLE 12

A stirred mixture of 1-p-chlorobenzoyl-2-aldehydo-5-dimethylamino-3-indolylacetic acid (0.01 mole), ethylene glycol (10 ml.) and p-toluenesulfonic acid (0.011 mole) in benzene (100 ml.) was heated at reflux until the theoretical volume of water was collected in a Dean-Stark water trap. The benzene reaction system was then cooled to room temperature, washed well with water (2×100 ml.) and then the pH of the aqueous extracts was adjusted to 5 in the aqueous base to afford crude 1-p-chlorobenzoyl-2 - ethylenedioxymethyl - 5 - dimethylamino - 3 - indolylacetic acid which was purified by recrystallization from equeous ethanol.

The open chain acetal [i.e., 2-(R″O)$_2$CH—] may be prepared exactly as above using an alkanol, e.g. ethanol (R″=ethyl) instead of ethylene glycol.

EXAMPLE 13

A solution of 1-p-chlorobenzoyl-2-tosyloxymethyl-5-methoxy-3-indolylacetic acid (0.1 mole) in 100 ml. of glacial acetic acid containing 0.1 equivalent of sodium acetate was stirred at 25° C. for 18 hours. The solution was concentrated to dryness in vacuo and the residue taken up in ether, and filtered. The filtrate was concentrated in vacuo and recrystallized from t-butanol to give 1 - p-chlorobenzoyl - 2 - acetoxymethyl - 5 - methoxy-3-indolylacetic acid.

Ethers of the 2-hydroxymethyl starting material are prepared by dissolving said starting material in the alcohol along with 2 equivalents sodium alkoxide (e.g., ethanol and sodium ethoxide). The mixture is stirred for 18 hours. The ether product is obtained by working up as in Example 13.

EXAMPLE 14

A solution of 1-p-chlorobenzoyl-2-tosyloxymethyl-5-dimethylamino-3-indolylacetic acid (0.1 mole) in 100 ml. of glacial acetic acid containing 0.1 equivalent of sodium acetate was stirred at 25° C. for 18 hours. The reaction mixture was concentrated to dryness in vacuo and the residue taken up in water and filtered. The pH of the aqueous filtrate was adjusted to 5 and the precipitated product was recrystallized from aqueous ethanol to give 1 - p-chlorobenzoyl - 2 - acetoxymethyl - 5 - dimethylamino-3-indolylacetic acid.

Ethers of the 2-hydroxymethyl starting material are prepared by dissolving said starting material in the alcohol along with 2 equivalents sodium alkoxide (e.g., ethanol and sodium ethoxide). The mixture is stirred for 18 hours. The ether product is obtained by working up as in Example 14.

EXAMPLE 15

5-hydroxylevulinic acid pyranyl ether ester is prepared from 5-hydroxylevulinic acid by treatment with 2.1 equivalents of dihydropyrane in tetrahydrofuran solution containing a few drops of concentrated hydrochloric acid catalyst. The product is purified by distillation and then refluxed under nitrogen for 5 hours in anhydrous benzene with 1 equivalent of p-methoxyphenylhydrazine hydrochloride. After filtration of the precipitated ammonium chloride, the benzene solvent is removed under reduced pressure leaving pyranyl 5-methoxy-2-pyranyloxymethyl-3-indolylacetate. This is purified and then N-chlorobenzoylated by initial salt formation by treatment with sodium hydride in dimethylformamide solution followed by treatment with one equivalent of p-chlorobenzoyl chloride. The resulting amide is then depyranylated by stirring with a small amount of concentrated hydrochloric acid for 5 hours at room temperature in t-butanol as solvent. The product, 1-p-chlorobenzoyl - 5 - methoxy-2-hydroxymethyl-3-indolyylacetic acid crystallizes out and is removed by filtration.

EXAMPLE 16

5-hydroxylevulinic acid pyranyl ether ester is prepared from 5-hydroxylevulinic acid by treatment with 2.1 equivalents of dihydropyrane in tetrahydrofuran solution containing a few drops of concentrated hydrochloric acid catalyst. The product is purified by distillation and then refluxed under nitrogen for 5 hours in anhydrous benzene with 1 equivalent of p - dimethylaminophenylhydrazine hydrochloride. After filtration of the precipitated ammonium chloride, the benzene solvent is removed under reduced pressure, leaving pyranyl 5 - dimethylamino - 2 - pyranyloxymethyl - 3 - indolylacetate. This is purified and then N-chlorobenzoylated by initial salt formation by treatment with sodium hydride in dimethylformamide solution followed by treatment with one equivalent of p-chlorobenzoyl chloride. The resulting amide is then depyranylated by stirring with 1.1 equivalents of concentrated hydrochloric acid for 5 hours at room temperature in t-butanol as solvent. The solvent is removed and the residue taken up in water, filtered, and the pH of the aqueous filtrate adjusted to 5 by addition of aqueous base. The product, 1 - p - chlorobenzoyl - 5-dimethylamino - 2 - hydroxymethyl - 3-indolylacetic acid, precipitates out and is removed by filtration.

EXAMPLE 17

1 - p - chlorobenzoyl - 2-hydroxymethyl-5-methoxy-3-indolylacetic acid is converted to the p-toluenesulfonate ester by stirring for 3 hours with one equivalent of tosyl chloride in pyridine solution. Water is then added and after addition of dilute hydrochloric acid, the precipitated 1 - p - chlorobenzoyl - 5-methoxy-2-tosyloxymethyl-3-indolylacetic acid is collected by filtration, washed with water, dried over magnesium sulfate and recrystallized from t-butanol.

EXAMPLE 18

1 - p - chlorobenzoyl - 2-hydroxymethyl-5-dimethylamino-3-indolylacetic acid is converted to the p-toluenesulfonate ester by stirring for 3 hours with one equivalent of tosyl chloride in pyridine solution. Water is then added and, after adjusting the pH to 5 with dilute hydrochloric acid, the precipitated 1 - p - chlorobenzoyl-5-dimethylamino - 2 - tosyloxymethyl - 3-indolylacetic acid is collected by filtration, washed with water, dried and recrystallized from aqueous ethanol.

EXAMPLE 19

A solution of 3.72 g. (0.01 mole) of 1-p-chlorobenzoyl-2 - aldehydo - 5 - methoxy-3-indolylacetic acid in 100 ml. of ethanol is added to 3 g. of amalgamated zinc covered by 5 ml. of concentrated hydrochloric acid. The well-stirred mixture is then refluxed for twenty-four hours. The reaction mixture is filtered, diluted with 500 ml. of water and the precipitated crude 1 - p - chlorobenzoyl-2 - methyl - 5 - methoxy-3-indolylacetic acid is filtered off and purified by recrystallization from t-butanol.

EXAMPLE 20

A solution of 0.01 mole of 1 - p - chlorobenzoyl-2-aldehydo - 5 - dimethylamino - 3-indolylacetic acid in 100 ml. of ethanol is added to 3 g. of amalgamated zinc covered by 5 ml. of water and 5 ml. of concentrated hydrochloric acid. The well-stirred mixture is then refluxed for twenty-four hours. The reaction mixture is filtered, diluted with 500 ml. of water and after adjusting the pH to 5 with aqueous base, the precipitated crude 1-p-chlorobenzoyl - 2 - methyl - 5-dimethylamino-3-indolylacetic acid is filtered off and purified by recrystallization from aqueous ethanol.

The procedures of Examples 19 and 20 can be varied by using sulfur-free toluene as a solvent, freshly poured zinc instead of the amalgam. When aqueous acetic acid is used as a diluent for the hydrochloric acid instead of water, the reduction is completed in a much shorter period of time (4–6 hours). Dioxane-hydrochloric acid solution may be used instead of the ethanolic solution used above. Other solvents may be used, such as aromatic hydrocarbons, high boiling ethers, tetrahydrofuran, alcohols, etc. Sulfuric acid may be used instead of HCl. Any temperature within the range of the freezing and boiling point of the solvent may be used although reaction proceeds best at elevated temperatures.

EXAMPLE 21

A mixture of 3.72 g. (0.01 mole) of 1 - p - chlorobenzoyl - 2 - aldehydo - 5-methoxy-3-indolylacetic acid and 4 g. of W2 Raney nickel in 100 ml. of ethanol is shaken under 1500 p.s.i. of hydrogen at 80° until the theoretical amount of hydrogen is taken up by the compound. The reaction mixture is then cooled to room temperature, filtered, and acidified with dilute hydrochloric acid. The precipitated 1 - p - chlorobenzoyl - 2-methyl-5-methoxy-3-indolylacetic acid is filtered off and purified by recrystallization from t-butanol.

The solvent may be another alcohol such as methanol, etc. The temperature range for this reduction is about 20–100° C. The pressure may be atmospheric or higher. Similarly, the reduction may be alternatively effected with a palladium catalyst.

EXAMPLE 22

A mixture of 0.01 mole of 1 - p - chlorobenzoyl-2-aldehydo - 5 - dimethylamino - 3-indolylacetic acid and 4 g. of W2 Raney nickel in 100 ml. of ethanol is shaken under 1500 p.s.i. of hydrogen at 80° until the theoretical amount of hydrogen is taken up by the compound. The reaction mixture is then cooled to room temperature, filtered and acidified with dilute hydrochloric acid to a pH of 5. The precipitated 1 - p - chlorobenzoyl - 2-methyl-5-dimethylamino-3-indolylacetic acid is filtered off and purified by recrystallization from aqueous ethanol.

EXAMPLE 23

A solution of 3.93 g. (0.01 mole) of 1-p-chlorobenzoyl-

2 - chloromethyl - 5 - methoxy-3-indolylacetic acid in 200 ml. of 95% aqueous ethanol is treated with 10 ml. of a standardized 1 N-sodium hydroxide solution (0.01 mole), followed by the addition of 0.5 g. of palladium on carbon. The mixture is shaken with one atmosphere of hydrogen until the calculated amount is taken up. The catalyst is then filtered off, the filtrate diluted with 200 ml. of water and then acidified with dilute hydrochloric acid. The resulting precipitate of 1 - p - chlorobenzoyl - 2-methyl - 5 - methoxy - 3-indolylacetic acid is filtered off and purified by recrystallization from t-butanol.

The catalyst used may alternatively be palladium, finely divided nickel or Raney nickel. If the latter is employed, because it normally contains adsorbed hydrogen, gaseous hydrogen may or may not be used. The catalyst support, if palladium or platinum is used, may be carbon, calcium carbonate, barium sulfate, etc. Other solvents may be used such as other alcohols, water, etc. The reaction may be affected with $H_2$ at high or low pressures.

The foregoing procedure will yield the same product when the corresponding 2-iodomethyl or 2-bromomethyl derivatives are used therein.

EXAMPLE 24

A solution of 0.01 mole of 1-p-chlorobenzoyl-2-chloromethyl-5-dimethylamino-3-indolylacetic acid in 200 ml. of 95% aqueous ethanol is treated with 10 ml. of a standardized 1 N-sodium hydroxide solution (0.01 mole), followed by the addition of 0.5 g. of palladium on carbon. The mixture is shaken with one atmosphere of hydrogen until the calculated amount is taken up. The catalyst is then filtered off, the filtrate diluted with 200 ml. of water and then acidified with dilute hydrochloric acid to a pH of 5. The resulting precipitate of 1-p-chlorobenzoyl-2-methyl-5-dimethylamino-3-indolylacetic acid is filtered off and purified by recrystallization from aqueous ethanol.

The catalyst used may alternatively be palladium, finely divided nickel or Raney nickel. If the latter is employed because it normally contains adsorbed hydrogen gaseous hydrogen may or may not be used. The catalyst support, if palladium or platinum is used, may be carbon, calcium carbonate, barium sulfate, etc. Other solvents may be used such as other alcohols, water, etc. The reaction may be effected with $H_2$ at high or low pressures.

The foregoing procedure will yield the same product when the corresponding 2-iodomethyl or 2-bromomethyl derivatives are used therein.

EXAMPLE 25

To a stirred solution of 3.93 g. (0.01 mole) of 1-p-chlorobenzoyl - 2-chloromethyl-5-methoxy-3-indolylacetic acid in 100 ml. of ethanol is added 5 g. of zinc dust. Then 10 ml. of dilute hydrochloric acid is added dropwise. When the slow addition is complete, the reaction mixture is filtered; the filtrate is concentrated under reduced pressure; and the residual 1-p-chlorobenzoyl-2-methyl-5-methoxy-3-indolylacetic acid is purified by recrystallization from t-butanol.

The corresponding 2-iodomethyl or 2-bromomethyl derivatives are similarly converted to the desired end product.

The procedure of the above example may be varied by allowing the 2-alkyl halide starting material to react with magnesium or a zinc-copper couple and an alcohol such as ethanol. Similarly, palladized zinc or amalgamated aluminum may be used in the range between the freezing and boiling points of the solvent.

EXAMPLE 26

To a stirred solution of 0.01 mole of 1-p-chlorobenzoyl-2-chloromethyl-5-dimethylamino-3-indolylacetic acid in 100 ml. of ethanol is added 5 g. of zinc dust. Then 10 ml. of dilute hydrochloric acid is added dropwise. When the slow addition is complete, the reaction mixture is filtered and the pH of the filtrate adjusted to 5 by addition of aqueous base. The precipitated 1-p-chlorobenzoyl-2-methyl-5-dimethylamino-3-indolylacetic acid is filtered off and purified by recrystallization from aqueous ethanol.

The corresponding 2-iodomethyl or 2-bromomethyl derivatives are similarly converted to the desired end-product.

The procedure of the above example may be varied by allowing the 2-alkyl halide starting material to react with magnesium or a zinc-copper couple and an alcohol such as ethanol. Similarly, palladized zinc or amalgamated aluminum may be used instead of zinc dust. Any temperature may be used in the range between the freezing and boiling points of the solvent.

EXAMPLE 27

A stirred solution of 4.04 g. (0.01 mole) of 1-p-chlobenzoyl - 2 - methylthiomethyl-5-methoxy-3-indolylacetic acid in 300 ml. of ethanol is treated with 20 g. of Raney nickel catalyst, and the mixture refluxed for 2 hours. After the heating period, the catalyst is removed by filtration; the filtrate is acidified with dilute hydrochloric acid and the crude 1-p-chlorobenzoyl-2-methyl-5-methoxy-3-indolylacetic acid filtered off and purified by recrystallization from t-butanol.

The same reaction may be similarly carried out on the 2-sulfhydrylmethyl or the 2-alkyl-, aryl-, or aralkyl-thiomethyl derivatives. Likewise, sulfone [S(O)R'], sulfoxide (—$SO_2R''$), ethylenedithio

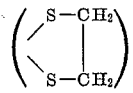

and disulfide (—S—SR") derivatives may be converted to the desired 2-methyl derivative.

The above reaction may or may not be carried out in an atmosphere of $H_2$ since Raney nickel usually contains sufficient adsorbed $H_2$ to effect the reduction. Since Raney nickel is basic, the product may be obtained as a salt. Acid may be added to form the free acetic acid derivative. Other alcohols such as methanol, etc., may be used. Any temperature between the freezing and boiling points of the solvent may be used, but the reduction proceeds fastest and most smoothly at higher temperatures.

EXAMPLE 28

A stirred solution of 0.01 mole of 1-p-chlorobenzoyl-2-methylthiomethyl-5-dimethylamino-3-indolylacetic acid in 300 ml. of ethanol is treated with 20 g. of Raney nickel catalyst, and the mixture refluxed for two hours. After the heating period, the catalyst is removed by filtration; the filtrate is acidified with dilute hydrochloric acid to a pH of 5 and the crude 1-p-chlorobenzoyl-2-methyl-5-dimethylamino-3-indolylacetic acid is filtered off and purified by recrystallization from aqueous ethanol.

The same reaction may be similarly carried out on the 2-sulfhydrylmethyl or the 2-alkyl-, aryl-, or aralkyl-thiomethyl derivatives. Likewise, sulfone [S(O)R'], sulfoxide (—$SO_2R''$), ethylenedithio

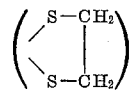

and disulfide (—S—SR") derivatives may be converted to the desired 2-methyl derivative.

The above reaction may or may not be carried out in an atmosphere of $H_2$ since Raney nickel usually contains sufficient adsorbed $H_2$ to effect the reduction. Since Raney nickel is basic, the product may be obtained as a salt. Acid may be added to form the free acetic acid derivative. Other alcohols such as methanol, etc., may be used. Any temperature between the freezing and boiling points of the solvent may be used, but the reduction proceeds fastest and most smoothly at higher temperatures.

EXAMPLE 29

A mixture of 5.29 g. (0.01 mole) of 1-p-chlorobenzoyl-2 - trimethylaminomethyl - 5 - methoxy - 3 - indolylacetic acid iodide in 100 ml. of water containing 2.5 g. of sodium acetate and 0.1 g. platinum is shaken at room temperature under an atmosphere of hydrogen until the calculated amount of hydrogen is taken up (around 4 hours). The mixture is then filtered, made acidic with dilute hydrochloric acid; and the crude 1-p-chlorobenzoyl-2-methyl-5-methoxy-3-indolylacetic acid filtered and purified by recrystallization from t-butanol.

The reduction may be carried out also as above using derivatives in which the 2-ammonium group is substituted by alkyl, aryl or aralkyl groups. The anion of the quaternary ammonium groups may be Br⁻ or Cl⁻. The hydrogen pressure may be low (one atmosphere) or higher. The temperature may vary between the freezing and boiling points of the solvent. Alcohols and aqueous alcohols, dimethylformamide or tetrahydrofuran, with or without water present, may be used as the solvent instead of water alone. Similarly, the catalyst used in Example 29 may be replaced 5% palladium on charcoal.

EXAMPLE 30

A mixture of 4.01 g. (0.01 mole) of 1-p-chlorobenzoyl-2 - dimethylaminomethyl - 5 - methoxy - 3 - indolylacetic acid and 0.25 g. of 5% palladium on carbon in 100 ml. ethanol is shaken at room temperature under two atmospheres of hydrogen. When the theoretical amount of hydrogen is taken up by the compound, the catalyst is filtered off and the filtrate concentrated to dryness. The crude 1 - p - chlorobenzoyl - 2 - methyl - 5 - methoxy - 3 - indolylacetic acid is purified by recrystallization from t-butanol.

The same product is obtained when the starting material is replaced by other alkyl, aryl or aralkylaminomethyl derivatives.

Similarly, the solvent may be any alcohol in which the starting compound is soluble. The temperature may vary between the freezing and boiling points of the solvent. Higher or lower hydrogen pressures may be used, but very high pressures may cause reduction of the indole ring system and are not preferred.

EXAMPLE 31

A mixture of 0.01 mole of 1-p-chlorobenzoyl-2-dimethylaminomethyl-5-dimethylamino-3-indolylacetic acid and 0.25 g. of 5% palladium on carbon in 100 ml. ethanol is shaken at room temperature under two atmospheres of hydrogen. When the theoretical amount of hydrogen is taken up by the compound, the catalyst is filtered off and the filtrate concentrated to dryness. The crude 1-p-chlorobenzoyl-2-methyl-5-dimethylamino-3-indolylacetic acid is purified by recrystallization from aqueous ethanol.

The same product is obtained when the starting material is replaced by other alkyl, aryl or aralkylaminomethyl derivatives.

Similarly, the solvent may be any alcohol in which the starting compound is soluble. The temperature may vary between the freezing and boiling points of the solvent. Higher or lower hydrogen pressures may be used, but very high pressures may cause reduction of the indole ring system and are not preferred.

EXAMPLE 32

A mixture of 3.74 g. (0.01 mole) of 1-p-chlorobenzoyl-2-hydroxymethyl-5-methoxy-3-indolylacetic acid and 0.5 g. of 5% palladium on carbon in 100 ml. of ethanol is shaken with one atmosphere of hydrogen at room temperature until the calculated amount of hydrogen is taken up by the compound. The catalyst is then filtered off, the solvent concentrated to dryness and the crude 1-p-chlorobenzoyl-2-methyl-5-methoxy-3-indolylacetic acid is purified by recrystallization from t-butanol.

Other catalysts may be used such as platinum, copper chromite or nickel catalysts but the Pd-C catalyst is preferred. The reaction may be carried out in the same way with the same result using as the starting materials either 2-etherified or 2-acylated derivatives of the above 2-hydroxymethyl compound; the ether or acyl radical may be alkyl, aralkyl or aryl.

Alcohols such as methanol and ethanol are the best solvents. Larger amounts of catalyst may be used. Higher or lower hydrogen pressures may be used, although at very high pressures, reduction of the indole double bonds may take place. Any temperature may be used between the freezing and boiling points of the solvent.

EXAMPLE 33

A mixture of 0.01 mole of 1-p-chlorobenzoyl-2-hydroxymethyl-5-dimethylamino-3-indolylacetic acid and 0.5 g. of 5% palladium on carbon in 100 ml. of ethanol is shaken with one atmosphere of hydrogen at room temperature until the calculated amount of hydrogen is taken up by the compound. The catalyst is then filtered off, the solvent concentrated to dryness and the crude 1-p-chlorobenzoyl-2-methyl-5-dimethylamino-3-indolylacetic acid is purified by recrystallization from aqueous ethanol.

Other catalysts may be used such as platinum, copper chromite or nickel catalysts, but the Pd-C catalyst is preferred. The reaction may be carried out in the same way with the same result using as the starting materials either 2-etherified or 2-acylated derivatives of the above 2-hydroxymethyl compound; the ether or acyl radical may be alkyl, aralkyl or aryl.

Alcohols such as methanol and ethanol are the best solvents. Larger amounts of catalyst may be used. Higher or lower hydrogen pressures may be used, although at very high pressures, reduction of the indole double bonds may take place. Any temperature may be used between the freezing and boiling points of the solvent.

EXAMPLE 34

A mixture of 3.84 g. (0.01 mole) of 1-p-chlorobenzoyl-2-methoxymethyl-5-methoxy-3-indolylacetic acid and 4 g. of diisobutyl alumnum hydride in 100 ml. of tetrahydrofuran is refluxed for 4 hours with good stirring and exclusion of moisture. Then the reaction is cooled, and quenched into 0.5 liter of ice water. After filtration, the filtrate is acidified with dilute hydrochloric acid. The crude 1 - p - chlorobenzoyl-3-methyl-5-methoxy-3-indolylacetic acid which separates is filtered off and purified by recrystallization from t-butanol.

The same reaction may be carried out with the 2-aryloxymethyl or 2-aralkoxymethyl analog of the compound used in the example, with similar results.

At least two equivalents of the hydride reagent is desirable: one to form the salt of the —CH₂CO₂H side chain and one to effect the desired reduction. The solvent may be any ether such as dioxane, diethyl ether, etc., and the temperature may vary between the freezing and boiling points of the solvent.

EXAMPLE 35

A mixture of 0.01 mole of 1-p-chlorobenzoyl-2-methyl-5-dimethylamino-3-indolylacetic acid and 4 g. of diisobutyl aluminum hydride in 100 ml. of tetrahydrofuran is refluxed for four hours with good stirring and exclusion of moisture. Then the reaction is cooled, and quenched into 0.5 liter of ice water. After filtration, the filtrate is acidified with dilute hydrochloric acid to a pH of 5. The crude 1-p-chlorobenzoyl-2-methyl-5-dimethylamino-3- indolylacetic acid which separated is filtered off and purified by recrystallization from t-butanol.

The same reaction may be carried out with the 2-aryloxymethyl or 2-aralkyloxymethyl analog of the compound used in the example, with similar results.

At least two equivalents of the hydride reagent is desirable: one to form the salt of the —CH₂CO₂H side chain and one to effect the desired reduction. The solvent may be any ether such as dioxane, diethyl ether, etc., and the temperature may vary between the freezing and boiling points of the solvent.

EXAMPLE 36

To 3.93 g. (0.01 mole) of 1-p-chlorobenzoyl-2-chloromethyl-5-methoxy-3-indolylacetic acid in 100 ml. of tetrahydrofuran is added magnesium metal (0.01 mole, 0.243 g.). The mixture is shaken in a sealed vessel for 3 hours at room temperature. The reaction mixture is then quenched into 500 ml. dilute hydrochloric acid and the precipitated solids removed by filtration. After repeated recrystallization from t-butanol, there is obtained pure 1-p-chlorobenzoyl-2-methyl - 5 - methoxy-3-indolylacetic acid.

The reducing agent in the above reaction is the extremely active nascent hydrogen produced by reaction of magnesium metal with the acidic proton of the acetic acid side chain. This hydrogen, generated in situ, then effects hydrogenolysis of the $CH_2$-Cl bond to form a methyl group. The reaction mixture is quenched into dilute hydrochloric acid to reprotonate the magnesium salt of the acetic acid side chain.

Zinc may be used in the above reaction in place of magnesium.

A sealed vessel is required to prevent escape of the liberated nascent hydrogen. Any inert solvent in which the starting material has some solubility may be used such as dioxane, benzene, etc. The temperature may vary between the freezing and boiling points of the solvent used.

EXAMPLE 37

To 0.01 mole of 1-p-chlorobenzoyl-2-chloromethyl-5-dimethylamino-3-indolylacetic acid in 100 ml. of tetrahydrofuran is added magnesium metal (0.01mole, 0.243 g.). The mixture is shaken in a sealed vessel for 3 hours at room temperature. The reaction mixture is then quenched into 500 ml. of water, the pH adjusted to 5, and the precipitated solids removed by filtration. After repated recrystallization from aqueous ethanol, there is obtained pure 1-p-chlorobenzoyl - 2 - methyl 5-dimethylamino-3-indolylacetic acid.

The reducing agent in the above reaction is the extremely active nascent hydrogen produced by reaction of magnesium metal with the acidic proton of the acetic acid side chain. This hydrogen, generated in situ, then effects hydrogenolysis of the $CH_2$-Cl bond to form a methyl group.

Zinc may be used in the above reaction in place of magnesium.

A sealed vessel is required to prevent escape of the liberated nascent hydrogen. Any inert solvent in which the starting material has some solubility may be used such as dioxane, benzene, etc. The temperature may vary between the freezing and boiling points of the solvent used.

We claim:
1. A compound of the formula:

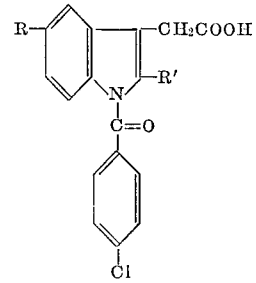

wherein R is methoxy or dimethylamino and R' is CH=Y, $CH_2X$, $CHX_2$; Y being,

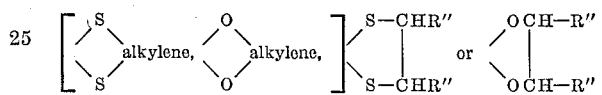

and X being Cl, Br, I, SR", SH, S(O)R", SSR", $N^+(R")_3Z^-$ $N(R")_2$, OH, OR", $SO_2R"$ or OC(O)R", wherein Z is Cl, Br or I and R" is lower alkyl, phenyl, tolyl, O-naphthyl, or benzyl.

2. The compound of claim 1 wherein R' is hydroxymethyl.

3. The compound of claim 1 wherein R' is tosyloxymethyl.

4. The compound of claim 1 wherein R is methoxy.

References Cited
UNITED STATES PATENTS
3,201,414   8/1965   Shen _____ 260—326.12

ALEX MAZEL, Primary Examiner

J. A. NARCAVAGE, Assistant Examiner

U.S. Cl. X.R.

260—326.13, 326.14